United States Patent
Austen

(10) Patent No.: US 11,774,174 B2
(45) Date of Patent: Oct. 3, 2023

(54) PROFILING AN OVEN

(71) Applicant: Electronic Controls Design, Inc., Milwaukie, OR (US)

(72) Inventor: Paul M. Austen, Milwaukie, OR (US)

(73) Assignee: Electronic Controls Design, Inc., Milwaukie, OR (US)

( * ) Notice: Subject to any disclaimer, the term of this patent is extended or adjusted under 35 U.S.C. 154(b) by 921 days.

(21) Appl. No.: 16/661,939

(22) Filed: Oct. 23, 2019

(65) Prior Publication Data

US 2020/0248965 A1 Aug. 6, 2020

Related U.S. Application Data

(60) Provisional application No. 62/799,585, filed on Jan. 31, 2019.

(51) Int. Cl.
*F27B 9/40* (2006.01)
*F27B 9/02* (2006.01)
*G06F 1/20* (2006.01)
*F27D 19/00* (2006.01)

(52) U.S. Cl.
CPC ............... *F27B 9/40* (2013.01); *F27B 9/028* (2013.01); *G06F 1/206* (2013.01); *F27D 2019/0003* (2013.01); *F27D 2019/0018* (2013.01)

(58) Field of Classification Search
None
See application file for complete search history.

(56) References Cited

U.S. PATENT DOCUMENTS

| | | | | |
|---|---|---|---|---|
| 6,799,712 B1 * | 10/2004 | Austen | ................... | B23K 1/008 228/103 |
| 2020/0248965 A1 * | 8/2020 | Austen | ................... | F27B 9/028 |

OTHER PUBLICATIONS

SolderStar APS, "SolderStar APS—Automatic Profiling Systems," https://www.solderstar.com/files/5715/5420/0569/Solderstar_APS.pdf, 2 pages (at least as early as Jul. 29, 2018).
SMTnet, "SolderStar Gets Data Smart at Productronica," https://smtnet.com/news/index.cfm?fuseaction=view_news&news_id=18331&company_id=48228, 2 pages (May 20, 2016).
McWiggin, "Automatic Profiling Systems—How it has improved production," *Electronics Production World*, 4 pages (at least as early as Dec. 2015).

* cited by examiner

*Primary Examiner* — Scott R Kastler
(74) *Attorney, Agent, or Firm* — Klarquist Sparkman, LLP

(57) ABSTRACT

Examples are described for predicting a thermal profile of a product in an oven using temperature measurements for each zone of the oven. An example method of producing a predicted thermal profile of a product in an oven includes measuring the temperature of each oven zone using a zone temperature sensor as the product transitions through the zone, and calculating the predicted thermal profile of the product using a baseline temperature profile and the measured temperatures of each zone at the time the product is in each zone. Parameters of the predicted thermal profile may be compared to thermal targets corresponding to a process specification for the product in order to determine whether the product was processed according to the process specification.

12 Claims, 9 Drawing Sheets

PROFILING AN OVEN

CROSS REFERENCE TO RELATED APPLICATION

This application claims priority from U.S. Provisional Application No. 62/799,585, filed Jan. 31, 2019, which application is incorporated by reference in its entirety.

BACKGROUND

Ovens with multiple temperature zones are used in a variety of industries including the electronics, baking, and painting industries. A product positioned in an oven may be static, whereby the temperature of the oven changes with time, and the product is stationary. Alternatively, the product may be moving, for example, conveyor ovens have multiple heating zones through which products pass (e.g., traversing the zones on a conveyor belt or similar mechanism). The zones (heating or cooling) are thermally isolated from each other by air curtains or other thermal isolation mechanisms. Such thermal isolation allows each zone to be maintained at a temperature that differs from other zones in the oven. One particular advantage of conveyor ovens with multiple zones is that products can be thermally treated to different temperatures at different times while passing through the oven. In all industries that use ovens, it is important that the ovens behave consistently over time. However, after extended use, the ovens will change in performance. Some causes of this change include variation in oven loading, dust accumulating on oven fans, and/or process bi-products accumulating on fans or blocking exhaust ports.

For products that are processed thermally, there is typically a defined time verses temperature profile (thermal profile) that the product experiences. This thermal profile is typically produced by transitioning the product through an oven over time, either by moving the product through the oven on a conveyor (e.g., to expose the product to different zones of the oven) or by holding the product stationary and changing the temperature of the oven over time. The product's thermal profile may be measured to assure that the thermal profile of the product meets one or more thermal targets and/or requirements.

The process of directly measuring the product thermal profile involves instrumenting the product with one or more temperature sensors and recording the product's temperature over time as the product is processed and/or transitioned through the oven. The recorded thermal profile of the actual product's temperature over time can then be analyzed to determine if the temperature meets the requirements of the process.

SUMMARY

Performing a direct determination of a product's thermal profile is time consuming and often difficult, since the determination utilizes significant instrumentation and can interrupt production. The embodiments herein provide an apparatus and method for accurately predicting and recording a product's thermal profile as the product passes through the temperature zones of an oven.

The disclosed systems and methods minimize the frequency of conducting a product thermal profile and include measuring the oven itself using fixed temperature and conveyor speed sensors and, with associated algorithms, predicting the oven's zones' effect on the product's thermal profile. These predictions utilize the product's actual thermal profile data set (referred to herein as the "baseline" thermal profile) and the current oven temperature and conveyor speed measurements to produce an accurate prediction of the product's thermal profile (e.g., reflecting or estimating the temperature changes that the product experienced while passing through the oven). The result is to record that the product's thermal profile is correct, or, in some cases, faulty based on the analysis of the predicted product profile.

The method can also be used in non-conveyor ovens as well by using temperature versus time measurements in the above-referenced algorithms to predict the oven's effect on the product's thermal profile. In one example, a method of producing a predicted thermal profile of a product in an oven includes measuring the temperature of each oven zone using a zone temperature sensor as the product transitions through the zone (e.g., via movement in a conveyor oven or via temperature changes in a non-conveyor oven), and calculating the predicted thermal profile of the product using a baseline thermal profile and the measured temperatures of each zone at the time the product is in each zone.

The foregoing and other objects, features, and advantages of the invention will become more apparent from the following detailed description, which proceeds with reference to the accompanying figures.

DETAILED DESCRIPTION

Figure 1:
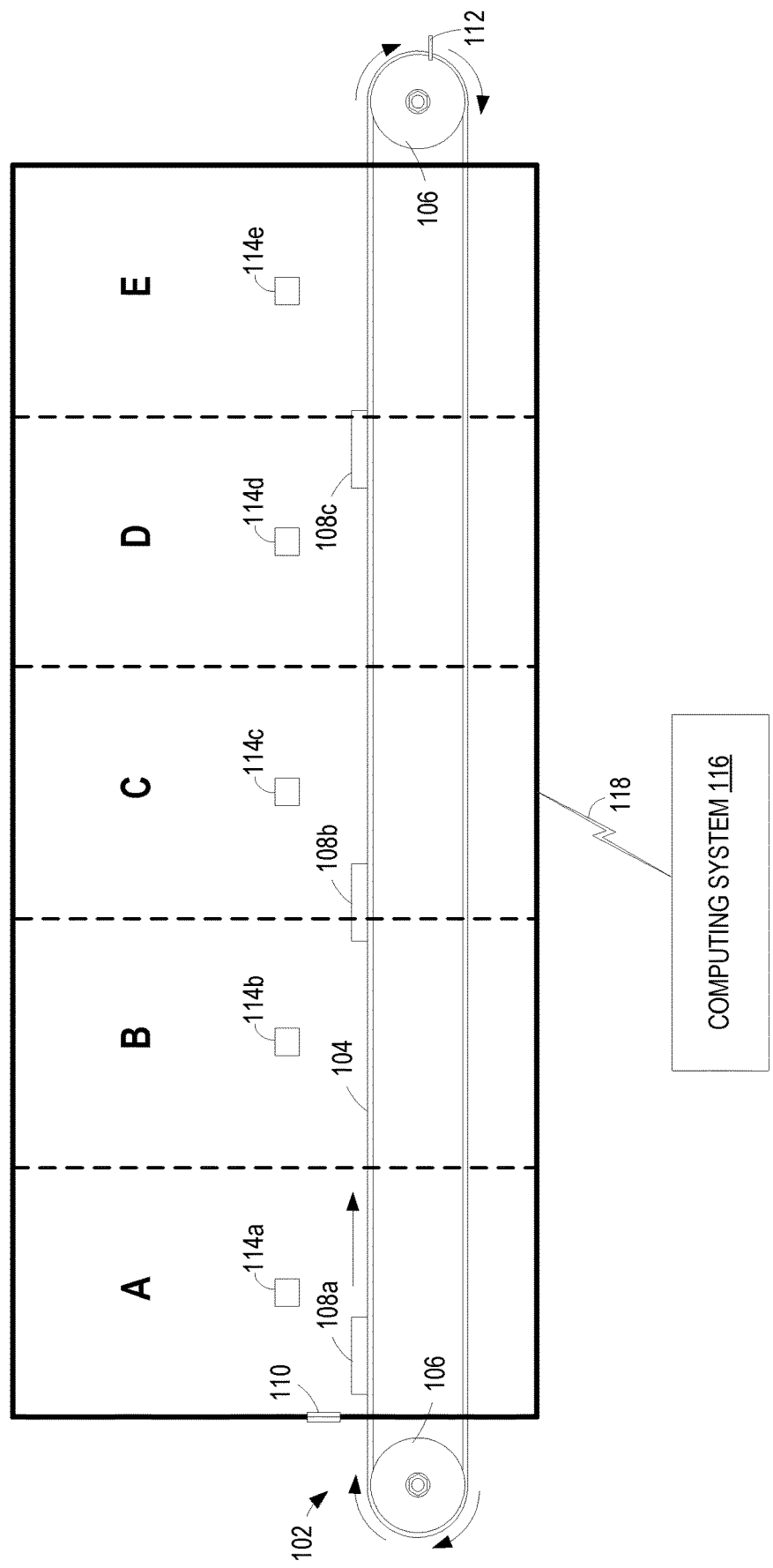
FIG. 1 schematically shows a side view of an example multi-zone oven showing products that are moving through zones of the oven.

If a product is to be processed thermally, there is typically a defined time verses temperature profile (thermal profile) that the product is targeted to experience. This thermal profile is typically produced by passing and/or transitioning the product through an oven over time, either by moving the product through the oven on a conveyor or by holding the product stationary and changing the temperature of the oven over time. The product's thermal profile may be measured and/or evaluated to assure that it meets the requirements of the thermal process.

For example, the product's thermal profile may be measured initially (e.g., by capturing direct measurements of a temperature of the product over time in the oven) to establish a baseline and confirm oven operating settings/configurations to achieve the thermal processing specifications for the product. Subsequently, during on-going processing of products through the oven, the product and/or oven may be evaluated to confirm whether the oven is operating appropriately to achieve the thermal processing specifications for the product. In one example, a "snap shot" (e.g., measurements of temperatures in the different zones of the oven, a measurement of a conveyor speed, and/or other measurements taken at substantially the same instant in time) of the oven operation may be performed for each product that is passed through (or queued to be passed through) the oven. The snap shot may include one or more oven temperature measurements, such as one or more zone temperature measurements, and one or more timing measurements, such as a conveyor speed or other measurement indicating how quickly the product is estimated to transition between zones of the oven.

There are two example times when the above-described oven snap shot may be captured. In a first example, just before the product enters the oven, a snap shot is taken. The snap shot may be used to derive a predicted thermal profile for the product, indicating a predicted effect of the oven on the product based on the measurements of the snap shot. The predicted effect may include Key Process Indicator (KPI) measurements, which relate to specifications for processing the product (e.g., time that the product spends at a selected temperature, peak temperature of the product, and/or other characteristics). If the product's predicted thermal profile's KPI measurements are within specification, then it is deemed acceptable to let the board enter the oven. In a second example, just after the product exits the oven, a snap shot is taken. If the product's predicted thermal profile's KPI measurements are within specification, then the product is indicated to have been processed properly.

However, as described above, the above two examples of taking snap shots of oven operation do not account for dynamic conditions of the oven over the time the product is actually in the oven and thus may provide inaccurate results. The oven parameters (e.g., zone temperatures) may change after the product enters the oven or over the course of the product transitioning through the oven, rendering the initial, pre-entry snap shot and/or the final, post-exit snap shot inaccurate. As an illustrative example of a false negative and/or false positive result, an initial snap shot taken according to the first snap shot example described above may show that a late zone in the oven is not at a high enough temperature, meaning that the product is predicted to not be heated to a temperature specified by the processing specifications for the product. However, that zone may be in the process of heating up, and may reach the specified temperature by the time the product reaches the zone if the product were allowed to enter the oven. As an illustrative example of a false positive result, a post-exit snap shot taken according to the second snap shot example described above may show that all zones are operating at targeted temperatures that would heat the product in accordance with associated specifications for the product. However, one or more zones may have only reached the respective targeted temperature(s) after the product had already passed through the zone, so the product may not have been heated at the targeted temperature(s) while transitioning through the oven and thus may not have been heated according to specifications for the product.

In contrast, the disclosed approach considers the dynamic conditions of the oven, which may reduce the false negative results (e.g., incorrect indications that a product failed or is predicted to fail) and/or the false positive results (e.g., incorrect indications that a product was heated or is predicted to be heated according to specifications) described above. In an example operation, the system of the disclosure may detect the product entering the oven and track the product through the oven, collecting the temperatures of each oven zone (e.g., using the sensors in the oven's zones) while the product is in each zone. If the temperature in a given zone is measured more than once, while a product is in that zone, the average of the two or more measurements may be recorded for that product. The same is true for the conveyor speed, which may be measured multiple times while each product progress through the oven.

The collection of zone temperatures for the product and the average conveyor speed measured at the time the product is in each zone may be the values used to predict the product's thermal profile and thus the KPI measurements in accordance with the disclosure. This method of performing the prediction is advantageous because it records the actual zone temperatures over time, the time the product was actually in each zone, versus snap shots at some instant in time, which may be inaccurate as described above. The disclosed approach also allows one to pin point which product or products truly failed the specifications rather that assuming all products in the oven at the time of the snap shot failed. These are the "True Profile™" KPI measurements (see FIG. 7, described in more detail below).

As described above, the process of directly measuring the product thermal profile may include instrumenting the product with one or more temperature sensors and recording the product's temperature over time as the product is processed and/or transitioned through the oven. The recorded thermal profile of the actual product's temperature over time can then be analyzed to determine if it meets the requirements of the thermal process.

As further described above, performing a direct determination of a product's thermal profile is time consuming and often difficult, since the determination utilizes significant instrumentation and can interrupt production. In order to address these issues, the present disclosure provides systems and methods that minimize the frequency of conducting a product thermal profile and rely on measuring the oven itself and using fixed temperature and conveyor speed sensors and, with well-established algorithms, that "predict" the oven's zones effect on the product's thermal profile. These predictions utilize the product's actual thermal profile data set (the baseline thermal profile) and the current oven temperature and conveyor speed measurements to produce an accurate prediction of the product thermal profile.

In order to measure the oven's current condition, temperature sensors are placed in each zone and the conveyor speed is measured. Other physical parameters may also be measured and recorded whether the parameters influence the thermal profile or not. These parameters may include zone convection (e.g., air flow) rates or pressures, oven energy consumption, ambient room conditions (e.g., temperature and humidity), exhaust rates, etc. The zone temperatures and conveyor speed are used in the algorithm to perform the product's thermal profile prediction. All these measurements may be stored in database tables for historical record keeping and documentation of the process over time. These and other features are described in more detail below with reference to the associated figures.

FIG. 1 shows a side view of an example multi-zone oven 100, where each zone can be set at a different temperature than the other zones. In the illustrated example, the multi-zone oven 100 includes five zones (labelled A, B, C, D, and E and having boundaries represented by dashed lines), however the disclosed examples may also be applied to ovens with any number of zones (including ovens having a single zone). The illustrated example also shows multiple zones occupying different spatial locations in the oven, in which a product may transition between zones by moving through the oven. However, it is to be understood that the disclosed examples may also be applied to ovens in which one or more zones occupy the same spatial location (e.g., where a "transition" of a product from one zone to another zone may be affected by changing properties of the spatial location, such as changing a temperature of the location in the oven, rather than or in addition to moving the product through oven).

In examples, such as the illustrated example, in which the multi-zone oven includes multiple spatially-distributed zones, a conveyor system 102 may transport one or more products (e.g., product 108a, product 108b, and product 108c) through each zone. The conveyor system 102 includes a conveyor belt 104 and one or more conveyor drivers 106, which are rotatable to advance the conveyor belt (and any products disposed thereon) through the oven. An entry sensor 110 may detect when a product, such as product 108a, enters the oven. A conveyor sensor 112 may detect conveyor speed (e.g., a speed at which the conveyor belt 104 advances through the oven). It is to be understood that the entry sensor 110 and conveyor sensor 112 are schematically represented in FIG. 1, and the sensors may be positioned in any suitable location and take any form suitable to directly or indirectly capture the respective measurements and/or determinations (e.g., entry of a product into the oven and speed of the conveyor belt moving the product through the oven). The transition of the product through zones via the conveyor belt may occur substantially continuously (e.g., where the product is moved at a substantially steady conveyor speed through each of the zones from an entrance to an exit of the oven) in some examples. In other examples, the transition of the product through zones via the conveyor belt may occur in a stepped manner, in which the product is held statically in each zone for a respective predetermined amount of time and then moved via the conveyor belt to a next zone (or to an exit after being held in a last zone for the associated predetermined amount of time). It is to be understood that the examples described herein may apply to any oven that provides any of the above-described transitions of a product through temperature zones.

At least one respective temperature sensor may be provided in each zone of the multi-zone oven. For example, zones A, B, C, D, and E include temperature sensors 114a, 114b, 114c, 114d, and 114e, respectively, as illustrated. The temperature sensors 114a-114e are schematically represented in FIG. 1 and may be positioned in any suitable location and take any form suitable to directly or indirectly capture a measurement of temperature for a respective associated zone. In some examples, each temperature sensor may be positioned in a centralized location within the respective associated zone and/or at a location near a path of travel and/or position of a product within the oven (e.g., substantially adjacent thereto without coming into contact with any passing products) and may be configured to directly measure a temperature at that location within the respective zone. The number of temperature sensors is also schematically represented. For example, each zone may include multiple temperature sensors and/or one or more temperature sensors may be configured and/or positioned to measure a temperature for multiple zones. It is to be understood that any one or more of the sensors 110, 112, and 114a-e may be provided for use in performing predicted thermal profiling as described herein, and in some examples these sensors may be present in addition to further sensors that are otherwise used for general operation of the oven. For example, one or more of the sensors 110, 112, and 114a-e may be redundantly provided in addition to one or more additional (e.g., "native") entry sensors, conveyor speed sensors, temperature sensors, and/or other sensors of the oven. In such examples, one or more of the sensors 110, 112, and 114a-e may be located in different positions within the oven and/or feature different characteristics than corresponding native sensors in order to provide additional data points and/or targeted measurements for the purpose of thermal profiling. In other examples, one or more of the sensors 110, 112, and 114a-e may be included in the native sensors of the oven.

The multi-zone oven 100 may include and/or be communicatively connected to one or more computing systems, such as computing system 116. Communication link 118 between the oven and the computing system may include one or more internal communication links (e.g., a bus) and/or one or more external communication links (e.g., a wired and/or wireless communication link). Additional communication links may be present between components of the multi-zone oven 100 (e.g., between the sensors). Examples of computing systems that may include and/or be included in computing system 116 are described in more detail below with respect to FIGS. 2 and 8. As a general example, computing system 116 may receive input from the multi-zone oven 100 (e.g., from the temperature sensors 114a-114e, the entry sensor 110, the conveyor sensor 112, and/or any additional, native sensors of the oven) and/or provide output to control the multi-zone oven 100 (e.g., to control the operation of the conveyor drivers 106, directly or via an associated actuator/motor, in order to change a speed of the conveyor belt 104, and/or to control one or more heating elements of the multi-zone oven in order to change a temperature of one or more of the zones), to control an output device associated with the computing system/multi-zone oven (e.g., to output information related to a baseline and/or predicted thermal profile), and/or to update a database or other storage device (e.g., a database of baseline and/or predicted thermal profiles).

In some examples, the computing system 116 may include components and/or resources used for baseline and/or predicted thermal profiling (e.g., as described below with respect to FIG. 2) as a separate module from modules used in other operations of the oven (e.g., controlling the heating/fan operations of the oven, the speed of the conveyor of the oven, additional oven monitoring/diagnostics, etc.). In other examples, the baseline and/or predicted thermal profiling operations may share one or more components and/or resources of the computing system 116 that are also used for the other operations of the oven. In still other examples, the baseline and/or predicted thermal profiling may be performed using a different (e.g., separate) computing system from the computing system used in other operations of the oven (e.g., the computing system 116 may represent a first computing system used for baseline and/or predicted thermal profiling and a second computing system used for other operations of the oven). In some embodiments of the above examples, the module(s) and/or computing system used for baseline and/or predicted thermal processing may only communicate with the sensors 110, 112, and 114a-e, while the module(s) and/or computing system used for other operations of the oven may only communicate with other sensors of the oven (e.g., native oven sensors).

In some examples, the computing system 116 may be further communicatively connected to one or more input and/or output devices (e.g., integrated with the multi-zone oven or remote/separated from the multi-zone oven), such as a display, audio alerting device (e.g., speaker), indicator light, touch screen, touch pad, controller, keyboard, mouse, etc. The input and/or output devices may provide a human-machine interface enabling a user to provide input to control the multi-zone oven and/or view output regarding the functioning of the multi-zone oven and/or the status of products passing through the multi-zone oven (e.g., results from the baseline and/or predicted thermal profiling). Example user interface features and other computing functionality are described in more detail below with respect to FIG. 2.

Figure 2:
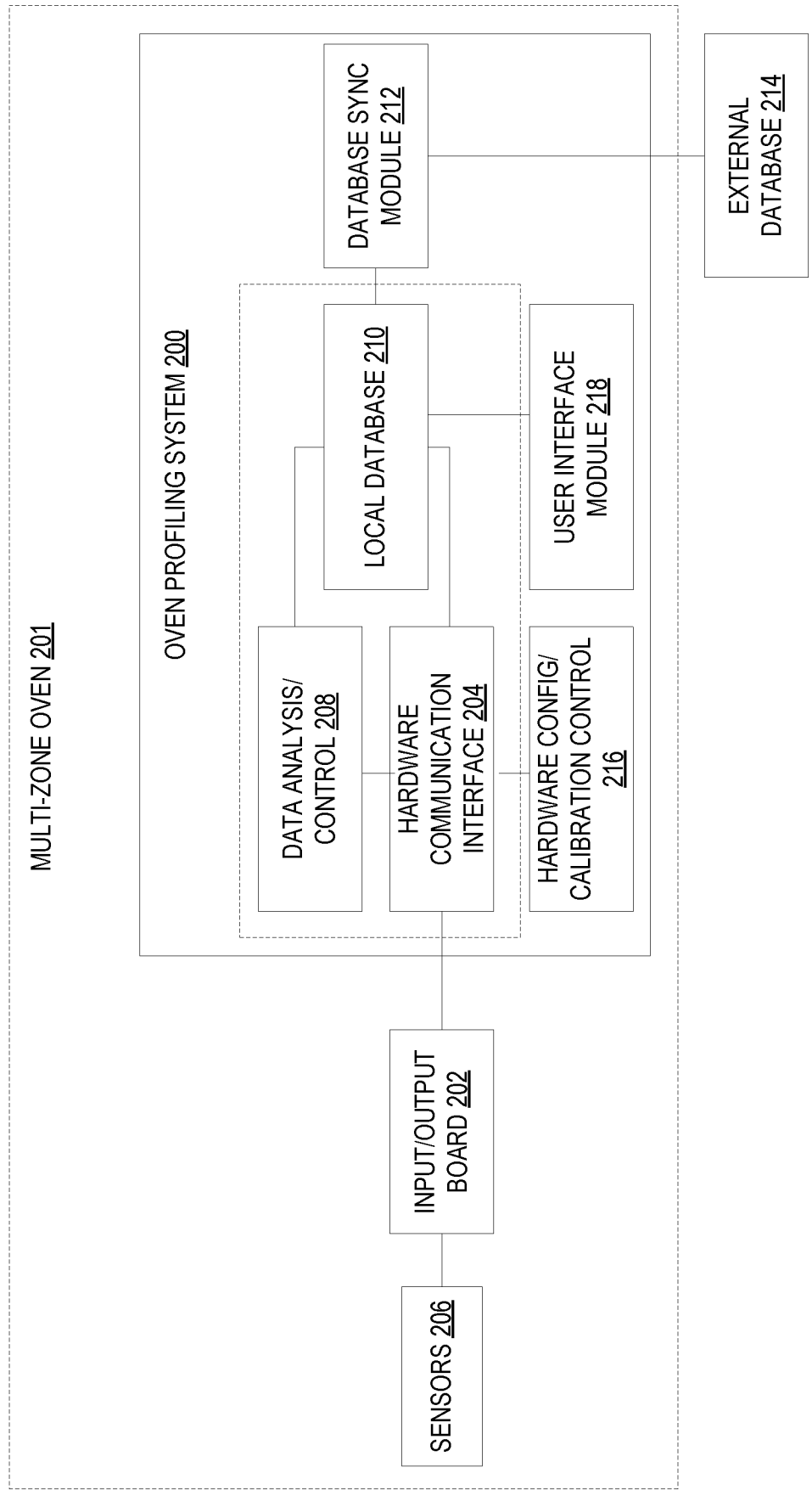
FIG. 2 is a block diagram of hardware and/or software components used in an example multi-zone oven.

FIG. 2 shows a block diagram of an oven profiling system 200, which may be an example of the computing system 116 of FIG. 1 and/or a portion thereof. For example, the oven profiling system 200 may be included in a multi-zone oven 201 or communicatively coupled to the multi-zone oven 201 and/or to sensors disposed within multi-zone oven 201 (e.g., sensors 110, 112, and 114a-e of FIG. 1). Multi-zone oven 201 may be an example of multi-zone oven 100 of FIG. 1 and thus may include one or more of the features disclosed above with respect to multi-zone oven 100 of FIG. 1. The oven profiling system 200 is communicatively connected to an input/output board 202 via a hardware interface 204. For example, the input/output board 202 may be located within and/or be directly connected to the multi-zone oven 201. The input/output board 202 is in turn connected to one or more sensors 206 and configured to receive sensed data from the one or more sensors 206. The sensors 206 may include sensors associated with the multi-zone oven 201, and may correspond to temperature sensors 114a-114e, entry sensor 110, and/or conveyor sensor 112 of FIG. 1. The sensors 206 may additionally or alternatively include sensors configured to measure other physical parameters relating to the multi-zone oven, such as sensors configured to measure parameters usable to determine zone convection rates, oven energy consumption, additional oven conditions (e.g., additional temperature and/or humidity readings), ambient room conditions (e.g., temperature and/or humidity), exhaust rates, and/or other parameters. The additional or alternative sensors described above may be included in the multi-zone oven, attached to the multi-zone oven, and/or physically separate from and associated with the multi-zone oven based on the parameter being measured. For example, a sensor for measuring ambient room conditions may be attached to or outside and physically separate from the multi-zone oven, a sensor for measuring energy consumption may be included in the multi-zone oven and/or in communication with a power system that powers the multi-zone oven, etc. The sensors 206 may provide sensor data to the oven profiling system 200, which uses the sensor data to determine operating parameters of the oven and/or other attributes (e.g., environmental conditions) of the oven.

The sensor data from sensors 206 may be received from the hardware communication interface 204 (e.g., via the input/output board 202) and provided to the data analysis/control unit 208 for processing. For example, the data analysis/control unit 208 may include software (e.g., processor-executable instructions stored on a storage device) that performs a product-temperature prediction algorithm based on measured oven temperature and a baseline product thermal profile (e.g., indicating how oven temperatures are expected to affect a temperature of the product). As will be described in more detail below, the disclosure provides for performing the product-temperature prediction algorithm based on measurements of zone temperatures within a multi-zone oven while a product is in the respective zones.

As described above, some systems calculate a prediction of the product thermal profile based on a "snap shot" of the oven's current conditions. The times when this oven "snap shot" is taken in such systems include 1) just before the product enters the oven or 2) just after the product exits the oven. A flaw in these two methods is: in method 1) an assumption is made that the oven will stay stable throughout the entire time the product is in the oven, or in method 2) an assumption is made that the oven was stable during the entire time the board was in the oven. Also, both methods force the operator to assume all products in the oven are bad at the time the snap shot was taken, if the measurements indicate out-of-specification operation. By measuring zone temperatures while the product is in the respective zones, the disclosed approach mitigates the above flaws, as on-going real-time operations within the oven are considered during product-temperature prediction.

The data analysis/control unit 208 may be connected to a local database 210 and may be configured to send an output of the product-temperature prediction calculation to the local database 210 for storage. In this way, an historical record of predicted product-temperatures may be stored at the local database 210 for later retrieval and/or analysis. The local database 210 may further store one or more products' baseline thermal profiles generated based on an earlier baseline measurement. The generation of baseline product thermal profiles is described in more detail with respect to FIG. 3 and may also be carried out by the data analysis/control unit 208. A baseline measurement may be performed fewer times than a product-temperature prediction calculation (e.g., the baseline measurement may be performed once a day, once a week, once a maintenance period, once a new product is designated for transitioning through the oven, and/or according to any suitable timing) and may be used to initially calibrate the oven and/or to calculate the product-temperature prediction as described above. The product-temperature prediction calculation (e.g., a predicted thermal profile determination) may be performed on a per-product basis each time a product transitions through the oven.

The local database 210 may be connected to a database synchronization module 212, which includes instructions stored on a storage device and executable by a processor of the oven profiling system 200 to coordinate the synchronization of data from the local database 210 with an external database 214. For example, the data synchronization module 212 may be configured to update the external database 214 (e.g., send data or copies of data from the local database 214 to the external database 214) at regular intervals and/or otherwise scheduled times to be in synchronization with the local database 210. In other examples, the data synchronization module 212 may be configured to update the external database 214 when the local database 210 is updated to store a threshold amount of new data (e.g., a threshold number of temperature measurements and/or a threshold number of product-temperature prediction calculations, such as each time the data analysis/control unit 208 determines a product-temperature prediction based on a product transitioning through all zones of the multi-zone oven 201). The database synchronization module 212 may additionally be configured to control periodic deletion of data from the local database 210 (e.g., in order to free up space for additional data). In some examples, data may be deleted from the local database 210 when transferred to the external database 214 and/or data from a prior transfer may be deleted when subsequent data is transferred (e.g., to minimize data loss risks by maintaining copies of data in both the local database and the external database for one transfer cycle). In other examples, the local database 210 may be a buffer, such as a first-in/first-out (FIFO) buffer, that is configured to automatically replace old data (e.g., oldest data) with new data when the buffer is full. In such examples, the database synchronization module 212 may be configured to schedule a data transfer of data from the local database 210 to the external database 214 when the local database reaches a threshold of a total capacity (e.g., when the local database is 75% full of data that has not been transferred to the external database 214).

The data analysis/control unit 208 may further be configured to compare the calculated product-temperature predictions (e.g., a predicted thermal profile) for a product to one or more specifications for the product to determine a product status of a processed product. If the calculated product-temperature predictions indicate that the product is outside of a threshold range of one or more values defined by the specification(s), that product may be flagged as being outside the specifications (e.g., "bad"). Otherwise, the product may be flagged as being within the specifications (e.g., "OK" or "good"). These flags may be stored in the local database 210 (e.g., associated with an identifier for each of the respective products) and/or the external database 214 in order to provide a historical record of products that successfully passed through the multi-zone oven (e.g., determined/predicted to meet process specifications during traversal through the multi-zone oven) and products that did not successfully pass through the multi-zone oven (e.g., determined/predicted to not meet process specifications during traversal through the multi-zone).

The output of the data analysis/control unit 208 (e.g., the product-temperature predictions and/or the flags indicating whether a product was determined to be maintained within process specifications during traversal through the oven) and/or the sensor data may also be provided to a hardware configuration/calibration control unit 216 (e.g., for calibrating the input/output board 202 and/or other elements of the oven profiling system 200). In some examples, the hardware configuration/calibration control unit 216 may receive the output/data via the hardware communication interface 204. The hardware configuration/calibration control unit 216 may include instructions stored on a storage device, which are executable by a processor of the oven profile system 200 to configure, calibrate, and/or otherwise control operation of the oven profiling system 200.

In some examples, the output of the data analysis/control unit 208 may be used to assist a user in responding to determined product statuses. For example, the output of the data analysis/control unit 208 may be used to provide a control recommendation or to automatically control one or more heating elements of the multi-zone oven 201 to set a temperature of each of the zones of the multi-zone oven 201. In automated control examples where the multiple zones are spatially separated, the output of the data analysis/control unit 208 may be used to generate a control signal that is transmitted to each of the heating element(s) that are associated with a given zone indicating a selected temperature or temperature change for each heating element that collectively changes the temperature of the zone to a value based on the data received from the data analysis/control unit 208. For example, if a product is flagged as having a product-temperature prediction that is below a process specification for the product in a selected zone, the control signal may be configured to control the heating element(s) associated with the selected zone to raise the temperature of the selected zone by an amount that is based on one or more prior product-temperature predictions and/or the temperature profile for the product. Similarly, for non-automated control examples, a recommendation may be output to recommend that a user perform a temperature adjustment as described above. In automated control examples where the multiple zones are temporally separated (e.g., a product is maintained in a same location and the temperature of that location is adjusted over time to transition the product between zones), the output of the data analysis/control unit 208 may be used to generate a control signal that is transmitted to each heating element of the multi-zone oven 201 indicating a selected temperature or temperature change for a particular time and/or time range associated with a given zone. For example, if a product is flagged as having a product-temperature prediction that is below a process specification for the product in a selected zone, the control signal may be configured to control the heating element(s) of the multi-zone oven 21 to raise the temperature at a particular time/time range associated with the selected zone by an amount that is based on one or more prior product-temperature predictions and/or the temperature profile for the product. Similarly, for non-automated control examples, a recommendation may be output to recommend that a user perform a temperature adjustment as described above.

The oven profiling system 200 may further include a user interface module 218 configured to coordinate interactions between the oven profiling system and a user of the oven profiling system. For example, the user interface module 218 may include and/or be in communication with one or more input and/or output devices, such as the example types of devices described above as being optionally connected to the computing system 116 in FIG. 1. Using the input device(s), a user may provide input to control operation of the oven profiling system 200 and/or to request information regarding the performance of the multi-zone oven/status of products processed by the multi-zone oven (e.g., request to perform and/or view results of thermal profiling operations). In some examples, the input device(s) associated with the user interface module 218 may be different from input devices used to control or otherwise interact with the multi-zone oven for other operations of the multi-zone oven (e.g., operations other than thermal profiling). Using the output device(s), the oven profiling system 200 may present information regarding the operation of the multi-zone oven 201 and/or the status of products processed by the multi-zone oven. For example, if a product is flagged as having a product-temperature prediction that is outside a process specification for the product, the user interface module 218 may control an output device to output an indication of this flag (e.g., a warning that the product did not successfully pass through the multi-zone oven and/or information regarding the predicted parameters that are outside of the specification). The user interface module 218 may also output an indication of information stored in the local database 210 (e.g., sensor data, product-temperature predictions, product temperature profile, etc.). The user interface module 218 may serve as a main user interface for the oven profiling system 200, and may control interactive features of the oven profiling system, such as providing start-up and log-in services (e.g., accepting user credentials and authenticating users), product builder services (e.g., coordinating the collection of process specifications for a given product), oven monitoring services (e.g., providing alerts, alarms, annotations indicating operating characteristics of the multi-zone oven), product changeover services (e.g., controlling a changeover from processing/predicting thermal profiles for a first type of product to a processing/predicting thermal profiles for second type of product that has a different baseline thermal profile, KPI specifications, etc.), and reporting services (e.g., reporting on the status of the processed product based on the information from the data analysis/control unit 208).

Figure 3:
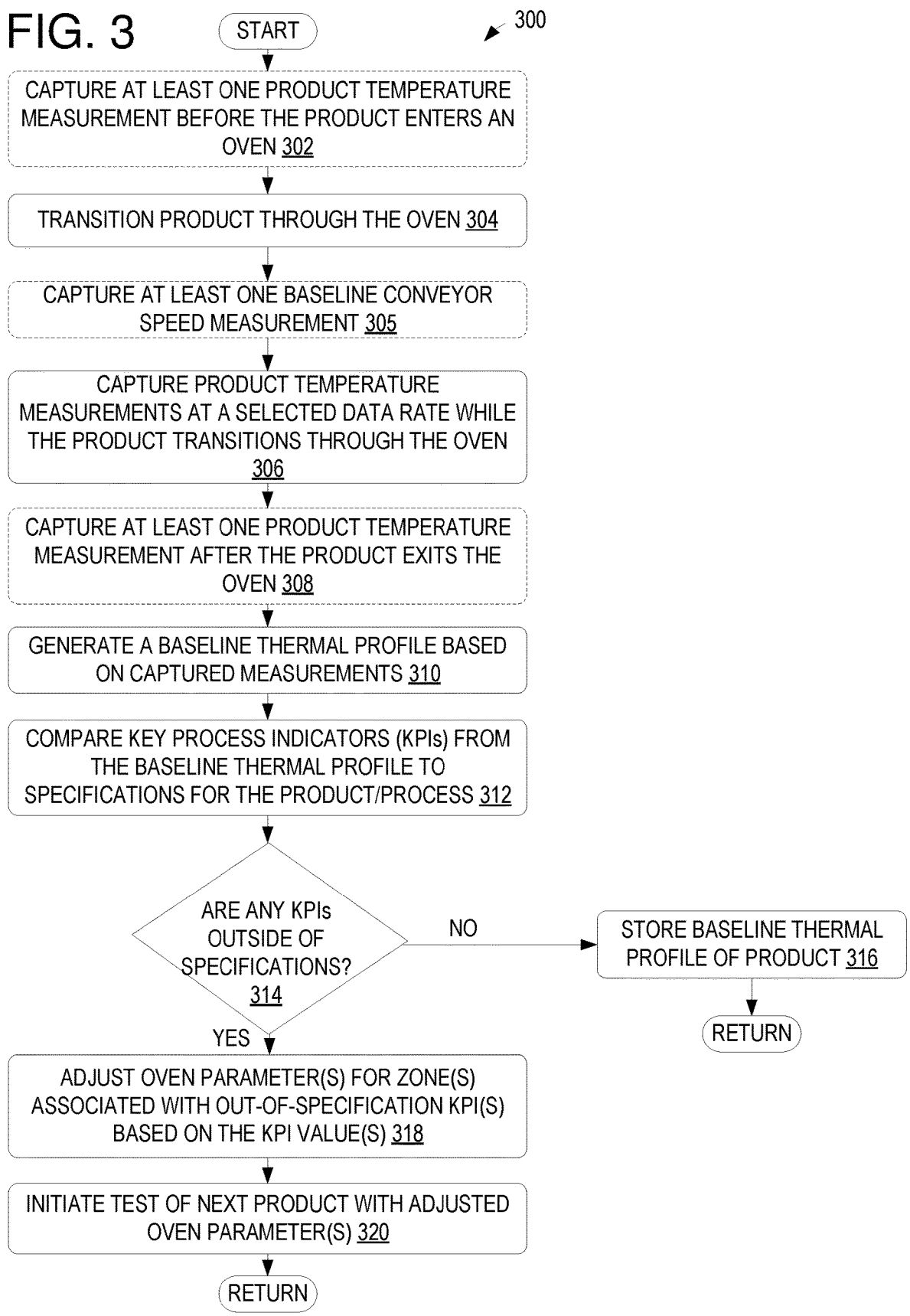
FIG. 3 is a flow chart for an example method of determining a baseline thermal profile for a product.

As described above, a product-temperature prediction may be performed using product-specific data, such as a baseline product thermal profile, which is captured through the use of direct measurements of product temperature as the product passes through an oven. FIG. 3 is a flow chart for a method 300 of capturing baseline measurements to determine a baseline thermal profile of a product that is passed through a multi-zone oven (e.g., multi-zone oven 100 of FIG. 1 and/or multi-zone oven 201 of FIG. 2). Method 300 and/or portions of method 300 may be performed by a controller and/or other computing system associated with the multi-zone oven, such as computing system 116 of FIG. 1 (or portions thereof) and/or oven profiling system 200 of FIG. 2, in coordination with one or more sensors and other mechanisms of the multi-zone oven (e.g., entry sensor 110 and/or conveyor sensor 112 of FIG. 1, temperature sensors disposed on a product entering the oven, etc.).

At 302, the method optionally includes capturing at least one product temperature measurement of a product (e.g., a test or baseline product) before the product enters the oven (e.g., before the product is heated by the oven). In this way, a baseline measurement of a starting temperature for the product may be determined such that an initial effect of the first zone on the temperature of the product may be evaluated (e.g., where the effect is change in product temperature relative to the starting temperature). The product temperature measurements described herein may be captured by one or more product temperature sensors (e.g., which may be separate from zone temperature sensors, such as zone temperature sensors 114a-114e of FIG. 1) that directly measure a temperature of the product (e.g., via direct contact with the product and/or via thermal imaging or similar contactless methods that target the product directly). For example, the product temperature sensor(s) may be configured and/or positioned to capture temperature measurements of points of interest on a product. Alternatively, an ambient air temperature can be used to predict (e.g., mathematically) the product's temperature profile.

At 304, the method includes transitioning the product through the multi-zone oven. Transitioning the product through the oven may include operating a conveyor system to move the product into and/or into different zones of the oven. In another example, transitioning the product through the oven may include operating one or more heating elements of the oven to create different zone temperatures in a same physical region over time. At 305, the method optionally (e.g., depending on oven type) includes capturing at least one baseline conveyor speed measurement (e.g., via a conveyor speed sensor of the oven, such as conveyor speed sensor 112 of FIG. 1). The baseline conveyor speed measurement may be captured for non-static multi-zone ovens, in which the transitioning of the product through the oven includes operating a conveyor system as described above. The baseline conveyor speed measurement may indicate a speed of the conveyor during performance of the baseline thermal profiling, which may thereby indicate a position of the product in the oven over time. In some examples, conveyor speed measurements may be captured at a selected data rate while the product is transitioned through the oven. In such examples, the conveyor speed measurements may be aggregated (e.g., averaged) to determine a representative conveyor speed measurement and/or the separate conveyor speed measurements may be correlated with a time value (e.g., a time since the product entered the oven). A conveyor speed may not be related to the transitioning of the product through the oven and thus may not be measured in other example ovens. For example, a conveyor speed may not be measured for static multi-zone ovens, in which the transitioning of the product through the oven includes creating different zone temperatures in the same physical region over time as described above, and/or for stepped conveyor ovens, in which the transitioning of the product through the oven includes, for each zone, holding the product in the zone for a respective predetermined amount of time and then moving (e.g., quickly) the product to a next zone/exit.

At 306, the method includes capturing product temperature measurements at a selected data rate (e.g., sampling rate) while the product transitions through the oven. Example data/sampling rates may include one product temperature measurement per second, one product temperature measurement every 5 seconds, multiple product temperature measurements per second, etc. In some examples, the data/sampling rate may be selected based on a length of time that the product is estimated to take to transition through all of the zones of the oven and/or the measured baseline conveyor speed. In examples where multiple sensors are disposed on the product (or otherwise a temperature sensor of the product is capable of taking multiple temperature measurements substantially simultaneously), each sensor may capture product temperature measurements at an associated data/sampling rate for that sensor (which may be the same for all sensors in some examples or different for at least one sensor in other examples). At 308, the method optionally includes capturing at least one product temperature measurement after the product exits the multi-zone oven (e.g., after the product exits the last zone of the oven).

Figure 4:
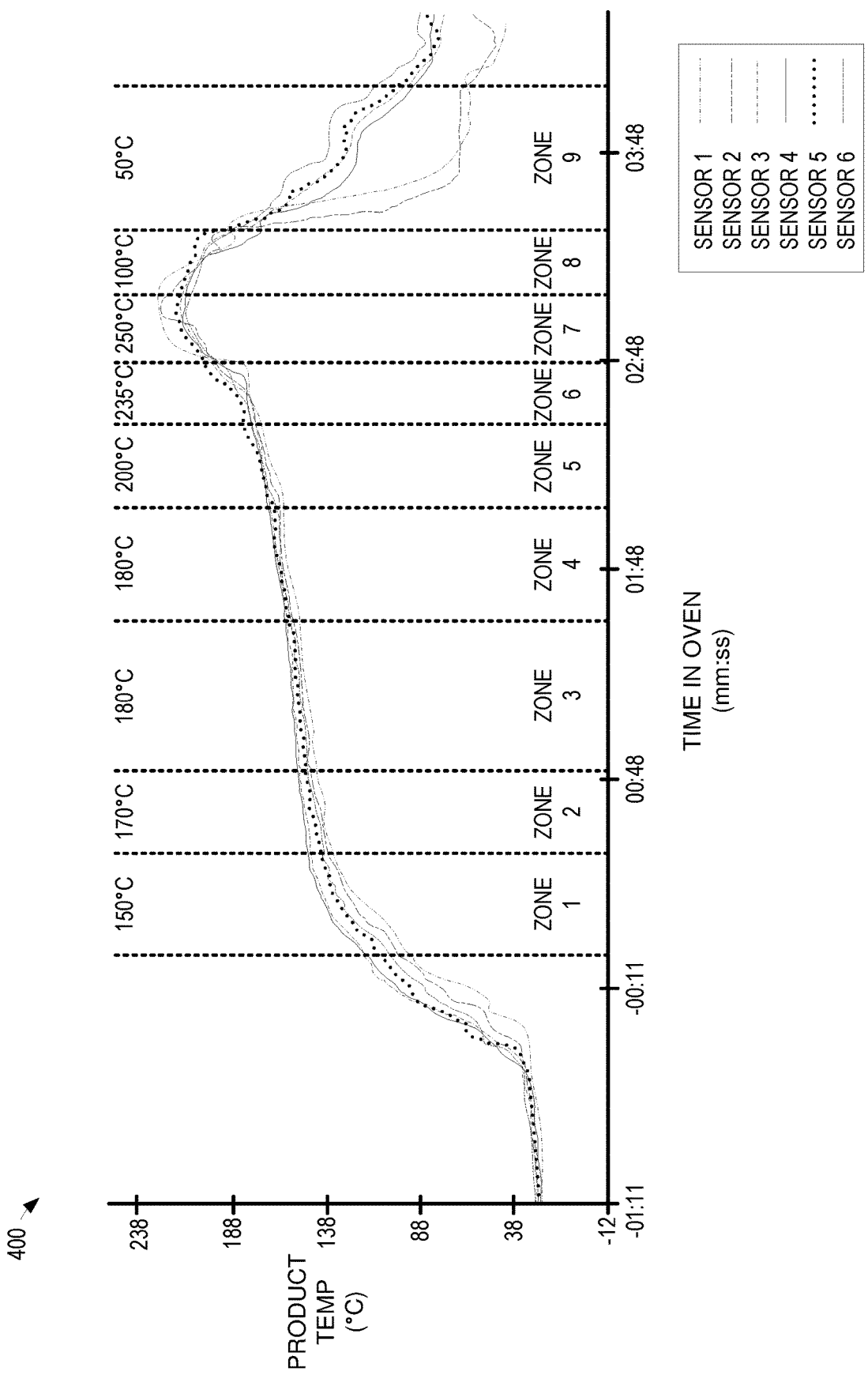
FIG. 4 shows example plots of a baseline thermal profile for an example product.
Figure 5:
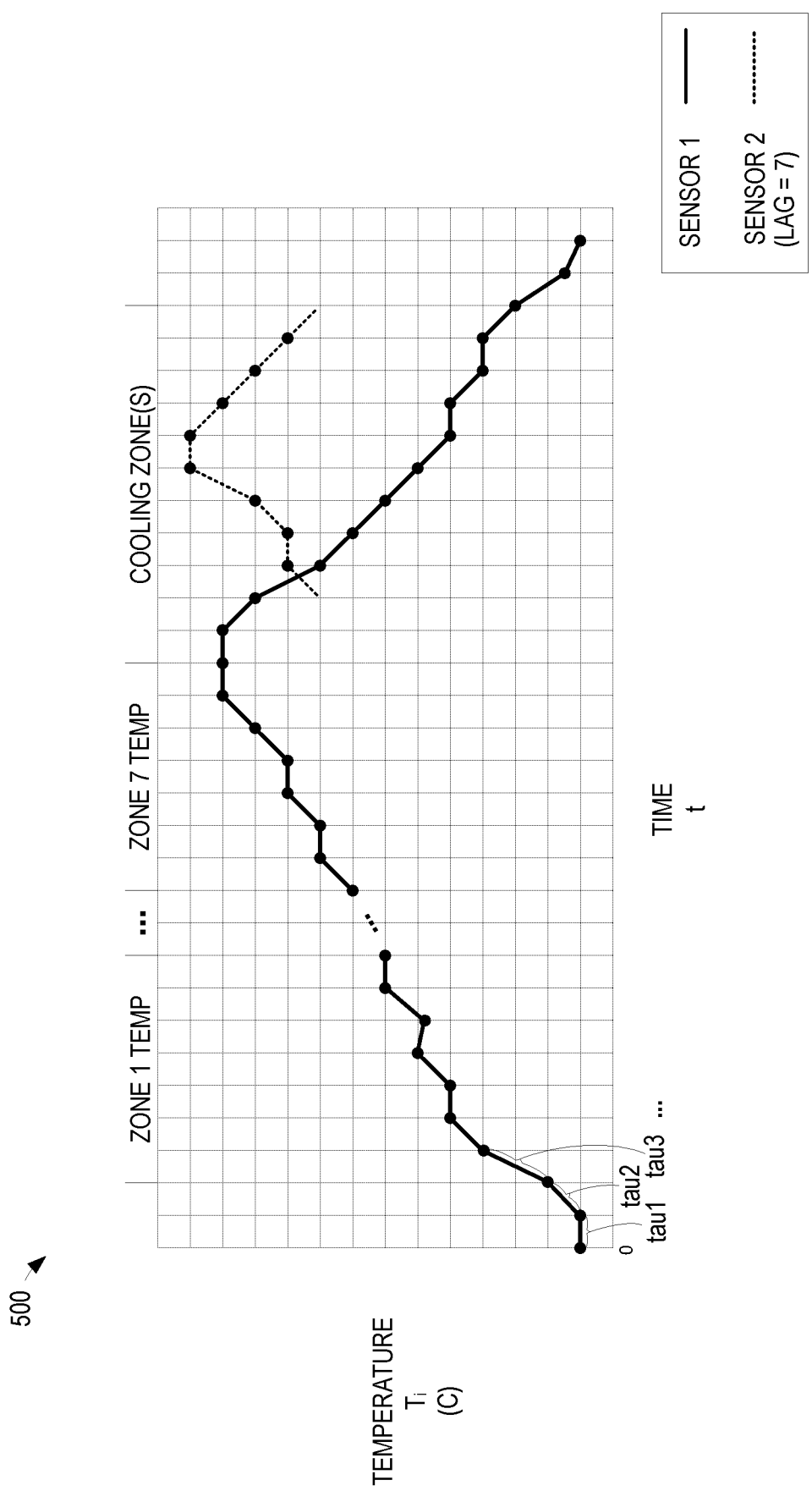
FIG. 5 shows a detailed view of the recorded temperatures of an example product's thermal profile and how different temperature sensors on the same product can lag in time depending on the placement of the sensors.

At 310, the method includes generating a baseline product thermal profile based on the captured measurements (e.g., the measurements captured at 302, 306, and/or 308). The baseline product thermal profile may indicate an effect that each zone of the oven has on the temperature of the product. For example, a rate of change in the product's temperature over time while in a given zone may indicate how quickly the associated zone temperature can be expected to increase or decrease the product's temperature under expected conditions. Examples of baseline product thermal profiles are shown in FIGS. 4 and 5, described in more detail below.

At 312, the method includes comparing key process indicators (KPIs) from the thermal profile to specifications for the product and/or product heating process. For example, KPIs may include parameters that are derivable from the predicted thermal profile and comparable to process specifications for the product, such as thresholds that ensure the product is damaged and/or ensure the product is processed properly to achieve a targeted finished product. Example thresholds may include an amount of time that the product is above a certain temperature (overall and/or in a given zone), an amount of time that the product is maintained between two selected temperatures, a maximum slope or rate of change in temperature experienced by the product, and/or any other suitable threshold.

At 314, the method includes determining if there are any KPIs that are outside of the specifications (e.g., by more than a tolerance threshold amount). If all KPIs are within specification (e.g., "NO" at 314), the method includes, at 316, storing the thermal profile, which was generated at 310. For example, the baseline thermal profile may be stored locally at the multi-zone oven (e.g., in local database 210 of FIG. 2) and/or stored remotely in a storage device that is in communication with the multi-zone oven and/or associated computing system. The storing of the baseline thermal profile may include storing an associated baseline conveyor speed (e.g., the baseline conveyor speed optionally measured at 305). After storing the baseline thermal profile of the product, the method may optionally exit the baseline measurement phase. Once the baseline measurement phase is exited, the resulting baseline thermal profile may be referenced during a later, operational phase, in which products are transitioned through the multi-zone oven and zone temperature measurements are taken in order to provide real-time diagnostics of the process. An example of the operational phase is described below with respect to method 600 of FIG. 6. As described above, the baseline measurement phase illustrated by method 300 may be performed less frequently than the operational phase, and the operational phase may represent a normal operation of the oven to heat products in a specified manner (e.g., for curing a product, setting thermal components of a product, baking a product, etc.).

If at least one KPI is outside of the specifications (e.g., "YES" at 314), the method includes adjusting one or more oven parameters for one or more zones associated with the out-of-specification KPI(s) based on the KPI value(s), as indicated at 318. For example, if a product is not heated to a particular targeted temperature while in a first zone, the temperature of the first zone may be increased by an amount based on the difference between the measured temperature of the product while in the zone and the targeted temperature for the product while in that zone. The adjustment of the oven parameters may be performed by a user (e.g., the method may include outputting an indication of the out-of-specification KPIs or the baseline thermal profile for the user to evaluate, or the method may include outputting a recommendation of an oven parameter adjustment based on the out-of-specification KPIs and the baseline thermal profile) or automatically (e.g., the method may include outputting a signal that is usable to adjust the oven parameters based on the out-of-specification KPIs and the baseline thermal profile).

At 320, the method includes initiating a test of a next product (e.g., another one of the same type of product that is to be heating according to the same specifications as evaluated at 312) with the adjusted oven parameters. The method thus returns to 302 (or 304) and proceeds through the method to capture product temperature measurements, generate a baseline thermal profile, and determine whether the adjusted oven parameters have successfully brought all KPIs with the tolerance threshold range of the specifications. In this way, method 300 may be iteratively repeated for test or baseline products of a given type in order to tweak oven parameters until the test or baseline products are determined to be processed according to the specifications and an associated baseline thermal profile is generated and/or stored. Furthermore, in some examples, the method may be repeated even after a baseline thermal profile is generated that indicates that all KPIs meet the specifications for confirmation of the results. For example, the method may be repeated until a threshold number of products (e.g., between two and ten total measured products or, in alternative examples, between two and ten consecutively measured products) have associated baseline thermal profiles that are within the specifications (e.g., have KPIs that are all within the tolerance thresholds of the respective values defined by the specifications).

FIG. 4 is an example plot 400 showing a baseline product thermal profile for an example product. For example, the product thermal profile shown in plot 400 may be generated via method 300 of FIG. 3 using different sensors disposed on a test or baseline product. The baseline product thermal profile plots product temperature measurements for a product (in degrees Celsius) over time (e.g., minutes/seconds), including time during which the product is in the oven. The time ranges associated with each zone are illustrated with broken boundary lines (e.g., starting with Zone 1, which has a set oven zone temperature of 150° C., and ending with Zone 9, which has a set oven zone temperature of 50° C.). The negative time measurements indicate times before the product enters the oven.

FIG. 5 is a plot 500 showing an example detailed representation of a baseline product thermal profile for a product (e.g., a close-up representation of a portion of plot 400 of FIG. 4). For example, plot 500 shows a very "close-up" look at the recorded temperatures of an example product's thermal profile and how different temperature sensors on the same product can "lag" in time because one temperature sensor enters the oven ahead of others, depending on the placement of the sensors. Similarly to plot 400 of FIG. 4, plot 500 shows a product thermal profile that plots product temperature measurements for the product over time, including time when the product is in the oven. The representation shown in plot 400 presents a close-up examination of a portion of the baseline product thermal profile for illustrative purposes, showing initial temperatures of the product (e.g., before entering the oven), temperatures of the product measured while the product is in a first zone, temperatures of the product measured while the product is in a seventh zone (intervening zones two through six are represented by the " . . . " in plot 500, however, specific temperature measurements associated with these zones are omitted in the illustrated plot for space considerations), temperatures of the product measured while the product is in an one or more cooling zones, and temperatures of the product measured after the product exits the oven. Each temperature measurement data point may be taken at regular intervals, such as once per second or once every 10 to 20 seconds. The product may be in each zone for longer than the selected intervals, such that multiple product temperature measurements are captured for each zone. For example, the product may occupy each zone for 30 to 40 seconds and a product temperature measurement may be taken once every second, thus 30 to 40 product temperature measurements may be captured for each zone. In this way, the baseline product thermal profile may indicate an effect of each zone on the product's temperature over time (e.g., over the respective duration that the product occupies each zone).

For example, the baseline product thermal profile for the product may be used to calculate an effect of each zone on the temperature of the product, referenced herein as tau ($\tau$). The product's materials heat up (or cool down) when subjected to a sudden change (e.g., unit step) in temperature. An example prediction algorithm described herein uses the actual baseline product thermal profile data (e.g., as shown in plot 500 of FIG. 5), which is performed once (or periodically re-done, such as annually) as described above. The prediction algorithm then calculates the oven's zones' effect on the thermal profile for each measured temperature and for all zones. This calculated effect is called "tau" and each data point in the products profile is thus assigned a unique tau (e.g., shown as the slope between two data points in the plot of FIG. 5) as calculated by the equations below:

$$\tau = -t/\mathrm{Ln}(T_t - T_s/T_i - T_s), \text{ where:}$$

Note: These values to calculate tau come from the baseline thermal profile t=time, or the ratio between the measured conveyor speed (e.g., the current measurement of the conveyor speed) and the baseline conveyor speed (e.g., the measurement of the conveyor speed taken when the baseline thermal profile was captured)

Tt=Temp of the part at any point in time t
Ts=The Zone Temperature measured at time t
Ti=The Initial temperature of the part
Ln=natural log.

The second sensor plot in FIG. 5 illustrates an example plot of temperature versus time (for the same product associated with the first sensor plot) as captured by a second sensor. The prediction algorithm takes into account that there may be more than one sensor in/on the product when the baseline thermal profile is measured. The multiple sensors may be located in/on respective positions of the product that result in some sensors entering the oven sooner than other sensors, resulting in a "lag" in sensor measurements relative to one another, as shown by the second channel plot. In order to aggregate measurements from multiple sensors, the lag may be accounted for by aligning the measurements (e.g., based on peaks of the plot or other alignment mechanisms).

Subsequently, each time the oven's conditions are measured during processing of the product (e.g., outside of the initial baseline testing phase), using these measurements and the taus for each data point, an accurate prediction can made to determine the predicted product thermal profile. The equation may be reordered to provide an estimate of the product's temperature given the known tau from the baseline thermal profile, as follows:

$$Tt = Ts + (Ti - Ts) * e^{\wedge}(-t/\text{tau}), \text{ where:}$$

e=base of the natural log (Ln).

Figure 6:
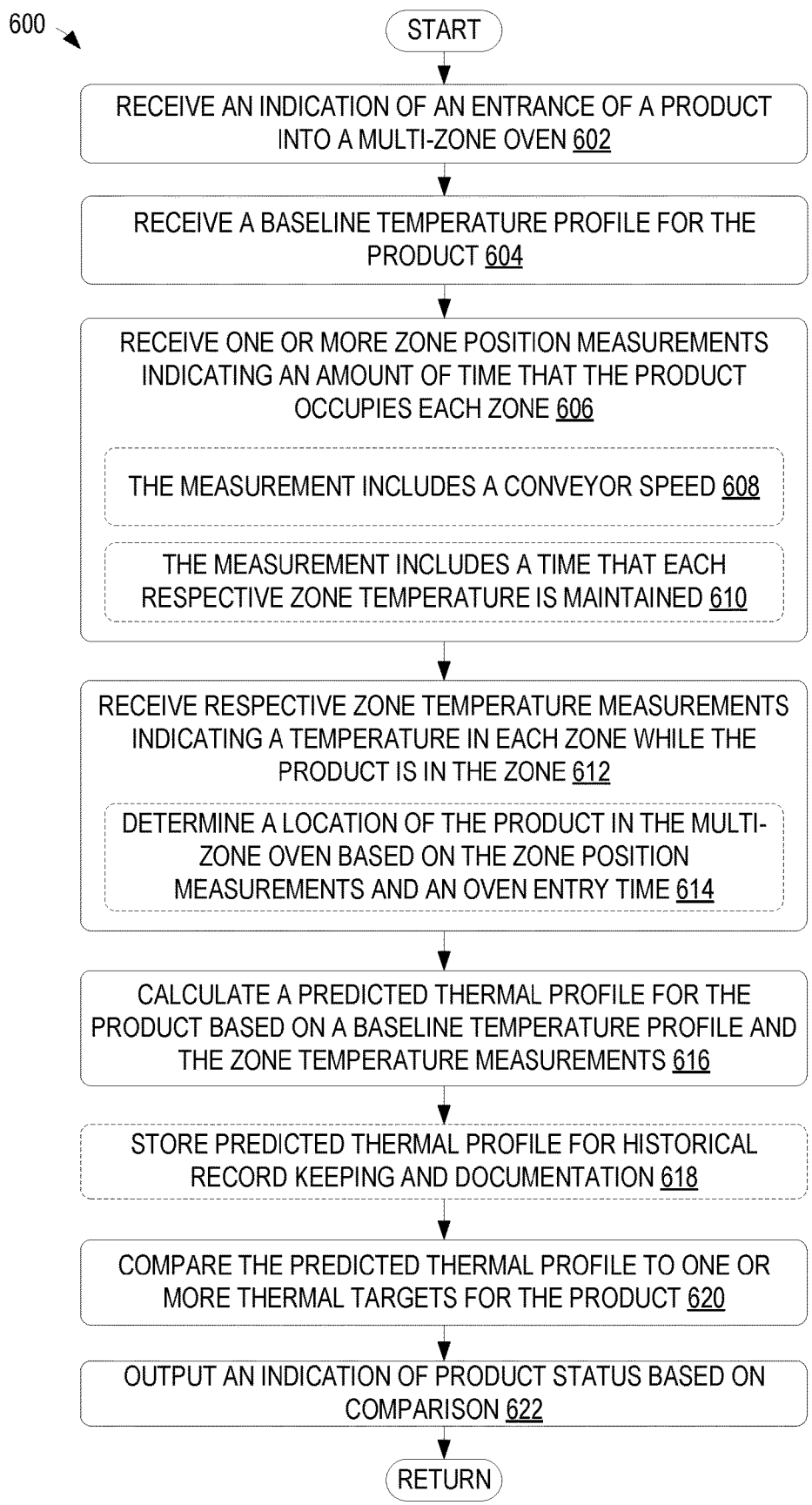
FIG. 6 is a flow chart for an example method of calculating a predicted thermal profile for a product.

An example of the above-described prediction of a product's thermal profile is shown in FIG. 6, which illustrates a flow chart for a method 600 of calculating a predicted thermal profile for a product. Method 600 and/or portions of method 600 may be performed by a controller and/or other computing system associated with the multi-zone oven, such as computing system 116 of FIG. 1 (or portions thereof) and/or oven profiling system 200 of FIG. 2, in coordination with one or more sensors and other mechanisms of the multi-zone oven (e.g., entry sensor 110, conveyor sensor 112, and/or temperature sensors 114*a-e* of FIG. 1). At 602, the method includes receiving an indication that the product has entered into a multi-zone oven. The indication may be received via an entry sensor mounted on or near the oven, such as entry sensor 110 of FIG. 1.

At 604, the method includes receiving a baseline temperature profile for the product. For example, the baseline temperature profile may be generated for the product (or product type) according to method 300 of FIG. 3. In some examples, where multiple baseline temperature profiles are generated according to method 300 of FIG. 3, the baseline temperature profile received at 604 may include an average or other aggregate temperature profile derived from the multiple baseline temperature profiles and/or from measurements by multiple sensors captured during baseline thermal profiling. The baseline temperature profile may be received from a local database (e.g., local to the computing system that performs method 600, the multi-zone oven, and/or an associated computing system) and/or may be received from an external data storage location (e.g., external database 214 of FIG. 2).

At 606, the method includes receiving one or more zone position measurements (e.g., measurements that may be used to derive a location of product relative to zones of the oven), where the zone position measurements indicate an amount of time that the product occupies each zone of the multi-zone oven. As indicated at 608, the zone position measurement may include a conveyor speed measurement (e.g., when the multi-zone oven includes multiple spatially-separated zones). For example, if the size of each zone is known (e.g., the length of each zone along the conveyor belt), then a conveyor speed may be used to identify when the product is located in each zone. Alternatively, as indicated at 610, the zone position measurements may include a time that each respective zone temperature is maintained (e.g., in examples where the product is relatively stationary in the oven and zone transitions are performed by changing an oven temperature at the location of the product over time). A current zone position of the product may thereby be determined based on a time lapse since the product entered the oven and time frames at which each zone temperature is maintained.

At 612, the method includes receiving (e.g., from an associated sensor, directly or indirectly), for each zone of the multi-zone oven, a respective zone temperature measurement indicating a temperature in a respective zone while the product is in the respective zone. The zone temperature measurements may be captured by one or more zone temperature sensors (e.g., temperature sensors 114*a-e* of FIG. 1) and measurements for each zone may include measurements captured at a selected data rate while the product is in the respective zone.

As indicated at 614, a location of the product in the multi-zone oven (e.g., an identification of which zone the product is currently occupying) may be determined based on the zone position measurements and an oven entry time (e.g., a time at which the product enters the oven, as indicated at 602). As indicated above, the zone position measurements may provide an indication regarding a length of time that a product spends in each zone (e.g., based on a speed of the conveyor moving the product through the oven or a length of time that the oven is maintained at each given zone temperature). Accordingly, occupancy of each zone may be associated with a respective time range relative to the oven entry time, and, for each zone, at least one measurement (e.g., multiple measurements, captured at the selected data rate) of the temperature of the zone may be captured during the time range associated with the zone. The zone temperature measurements may be stored for later retrieval and/or calculations.

At 616, the method includes calculating a predicted thermal profile for the product based on a baseline temperature profile (e.g., determined at an earlier time with an associated test or baseline product, using a method such as method 300 of FIG. 3) and the zone temperature measurements received at 612. As described above and shown in FIG. 5, the baseline temperature profile may be used to calculate an effect of each zone on the temperature of the product, referenced herein as tau (τ). In this way, during processing of the product in the oven, an estimate of the product's temperature at various time points/zone locations (e.g., during the time that the product is in the oven during method 600) may be derived given a known tau from the baseline thermal profile (e.g., instead of taking a direct measurement of the product's temperature). For example, the temperature of the product at various times t while the product is in the oven may be calculated using the above-referenced equation:

$$Tt = Ts + (Ti - Ts) * e^{(-t/\tau)},$$

where Ts corresponds to a zone temperature for the zone that the product occupies at time t (e.g., where t=0 corresponds to the time at which the product enters the oven and/or otherwise the time at which temperature measurements are started). The above equation, solved for the values of t during which the product is in the oven, may thus define the predicted thermal profile of the product for the associated pass through the oven in one example. It is to be understood that in other examples, the equation defining the predicted thermal profile of the product may include other terms to account for other parameters, such as zone convection (e.g., air flow) rates or pressures, oven energy consumption, ambient room conditions, exhaust rates, etc., without departing from the scope of this disclosure. As indicated at 618, the predicted thermal profile may optionally be stored (e.g., in one or more of the storage devices described herein) for historical record keeping and documentation.

At 620, the method includes comparing the predicted thermal profile to one or more thermal targets for the product. For example, the predicted thermal profile may include Key Process Indicator (KPI) measurements indicating thermal characteristics of the zones at selected times. These KPI measurements may be extracted from the predicted thermal profile and compared to associated KPI specifications and/or process specifications for the product in order to determine if any of the oven's predicted thermal profile's KPI measurements were shown to be out of specification (e.g., if any limits have been violated/exceeded). If the KPI values are all within specified limits, the product's thermal profile may be considered to be good and thus the product may be considered to have been processed within specification. Otherwise, if at least one KPI value is found to be outside an associated limit, the product may be considered to have been processed outside of specification and may be considered as not passing process specifications and/or may be subject to further review.

At 622, the method includes outputting and indication of a product status based on the comparison at 620. For example, an indication as to which (if any) of the product's predicted thermal profile's KPI measurements were shown to be out of specification (and optionally by how much) may be output for presentation to a user (e.g., output to a connected output device, such as a display or audio alerting device, and/or output to a remote device), examples of which are described above with respect to the output of the data analysis/control unit 208 of FIG. 2.

Figure 7:
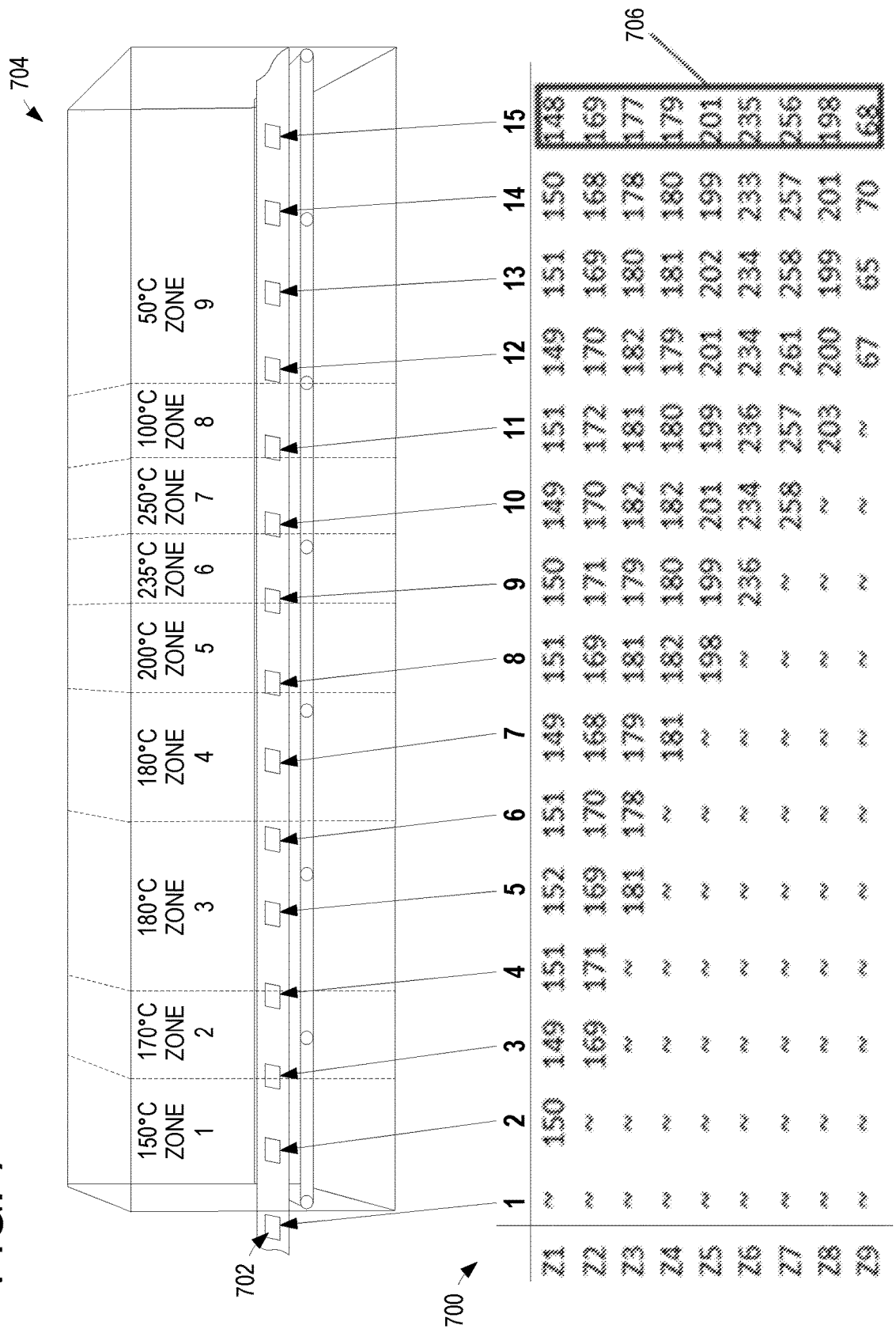
FIG. 7 schematically shows a side view of an example multi-zone oven and associated temperature measurements for products passing through zones of the oven.

FIG. 7 shows an example output table 700 of zone temperature measurements taken over time as products 702 (individually labelled 1-15) pass through a multi-zone oven 704. Multi-zone oven 704 may be an example of the multi-zone oven 100 of FIG. 1 and/or multi-zone oven 201 of FIG. 2, the descriptions of which may also apply at least in part to multi-zone oven 704. The multi-zone oven 704 may include a plurality of temperature sensors, which are collectively positioned and configured to capture zone temperature measurements for each zone (e.g., at least one temperature sensor may be positioned in each zone).

As shown, the number of zone temperature measurements taken for a given product increases as the product moves through the multi-zone oven. For example, product 1 has not yet entered the oven, so there are no zone temperature measurements for product 1 in the table 700 (e.g., entries for zones 1-9 are all filled with a null or placeholder value, each of which may be replaced by a respective measured temperature value as the product transitions through the zones). Product 2 is in zone 1, thus there is only a temperature measurement for zone 1 associated with product 2. Product 3 has entered zone 2, thus temperature measurements for zone 1 (which was taken prior to product 3 leaving zone 1) and zone 2 are present in the column for product 3. Products 12-15 have transitioned through all zones, thus the table entries for products 12-15 are filled for each of the zones 1-9. In the illustrated example, table 700 includes only one cell/entry for each zone/product pairing. Accordingly, if only one zone temperature measurement is taken per zone for each product, the associated cell may be populated with that zone temperature measurement value. In other examples, where multiple zone temperature measurements are taken per zone for each product, the associated cell/entry for each zone may be populated and/or dynamically updated with a representative measurement, such as an average (or running average) of all zone temperature measurements for that zone (while that product is in the zone) or a last zone temperature measurement for that zone (while that product is in the zone). The product's collection of zone temperatures measured over time, as the product occupies each zone, is used to predict the product's thermal profile for that oven pass-through. An example collection of zone temperatures used for product 15 is shown at 706. In this way, the disclosed systems and methods account for real-time operating parameters of a multi-zone oven to accurately predict a thermal profile of a product while minimizing the performance of direct product thermal profiling that utilize significant instrumentation and contribute to time delays in product processing.

Figure 8:
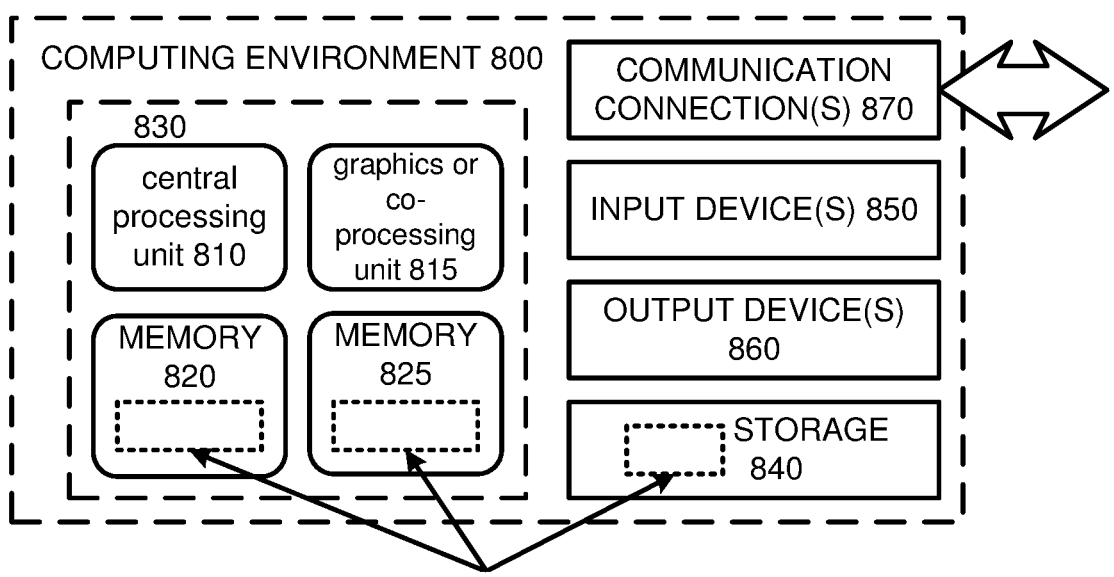
FIG. 8 is a block diagram of an example computing environment.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, smartphone, etc.). In some examples, computing environment 800 and/or portions of computing environment 800 may include or be included in computing system 116 of FIG. 1 and/or oven profiling system 200 of FIG. 2.

With reference to FIG. 8, the computing environment 800 includes one or more processing units, such as central processing unit (CPU) 810 and graphics or co-processing unit 815, and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 110 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, audio alerting device, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 9:
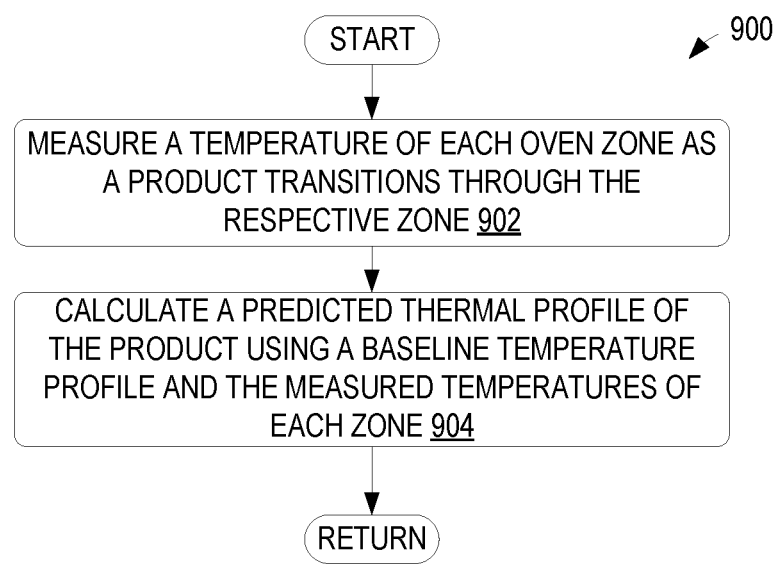
FIG. 9 is a flow chart for an example method of producing a predicted thermal profile of a product in an oven.

FIG. 9 is a flow chart for an example method 900 of producing a predicted thermal profile of a product in an oven. For example, method 900 may be performed by a computing device (e.g., computing system 116 of FIG. 1, oven profiling system 200 of FIG. 2, and/or computing environment 800 of FIG. 8) associated with a multi-zone oven (e.g., multi-zone oven 100 of FIG. 1, multi-zone oven 201 of FIG. 2, and/or multi-zone oven 704 of FIG. 7).

At 902, the method includes measuring a temperature (e.g., capturing a zone temperature measurement) of each oven zone of an oven as a product transitions through the respective zone. Accordingly, the method may include successively measuring zone temperatures until the product has transitioned through each zone of the oven, where each zone temperature measurement is captured for a respective zone only while the product is in the respective zone.

The temperature of each zone may be captured from within the respective oven zone by a zone temperature sensor, which may be mounted on and/or within the multi-zone oven. For example, each zone may have a respective zone temperature sensor mounted therein and used for measuring the temperature of that zone while the product is in the zone. In other examples, one or more zone temperature sensors used for capturing the measurements at 902 may be positioned to capture temperature measurements usable to derive zone temperatures for multiple zones.

As described above, transitioning through different temperature zones may include moving the product on a conveyor through an oven having multiple temperature zones in some examples. In other examples, transitioning through different temperature zones includes maintaining the product stationary within the oven and modifying the oven's temperature for a predetermined period of time. In order to determine when to measure a temperature of a given zone, the method may optionally include detecting when the product is in each zone using a measured conveyor speed as captured by a conveyor speed sensor and a position sensor that monitors the product entering the oven (e.g., as described above at 614 of method 600 of FIG. 6).

At 904, the method includes calculating a predicted thermal profile of the product using a baseline temperature profile (e.g., derived for the product or for an associated baseline product at an earlier time, such as during the performance of method 300 of FIG. 3) and the measured temperatures of each zone measured at 902 (e.g., temperature measurements for each zone that are taken as the product is in the respective zone).

The baseline temperature profile may be calculated/derived at an earlier time (e.g., before the product enters the oven for the execution of method 900) using measured product temperatures for the product or an associated baseline/test product (e.g., having a same product type as the product) as the product or baseline/test product transitions through the zone(s) of the oven. As a non-limiting example, the baseline temperature profile may be calculated using method 300 of FIG. 3.

The baseline temperature profile may be calculated/derived at the earlier time using the same computing device that performs method 900 in some examples. In other examples, the baseline temperature profile may be calculated/derived using a different computing device that stores the calculated/derived baseline temperature profile in a storage location that is accessible by the computing device that performs method 900. In such example, the computing device that performs method 900 may retrieve the stored baseline temperature profile associated with the product for use during the calculation of the predicted thermal profile of the product.

The calculation of the predicted thermal profile may utilize the information of the baseline temperature profile to derive effects of the measured zone temperatures on the product. For example, as described above with respect to the calculation performed at 616 in method 600 of FIG. 6, an estimate of the product's temperature at various time points/zone locations may be derived given a known tau from the baseline thermal profile. The compilation of estimates of the product's temperature at various time points/zone locations may thus represent the predicted thermal profile of the product for the associated pass through the oven.

The predicted thermal profile for the product may be stored for later retrieval and/or used to determine performance of the oven and/or product viability. For example, KPIs of the predicted thermal profile may be compared to associated thresholds (e.g., thermal targets) to determine whether the product was processed (e.g., heated by the oven) according to associated specifications for the product. For example, the specifications for the product may include targeted temperatures that the product experiences at given times/in given zones, times that the product spends at particular temperatures, rate of change of temperature of the product, etc. An indication of the oven performance and/or product viability (e.g., whether or not the product met the associated specifications as described above) may be output based on the comparison described above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A system for producing a predicted thermal profile of a product in an oven having a plurality of oven zones, the system comprising:
   a communication interface communicatively connected to one or more zone temperature sensors of the oven;
   a processor; and
   memory storing instructions executable by the processor to:
      receive, from the one or more temperature sensors via the communication interface, a plurality of temperature measurements including respective measurements of a temperature of respective oven zones of the oven as the product transitions through the respective oven zones; and
      calculate the predicted thermal profile of the product using a baseline temperature profile and the respective measurements of the temperature of the respective oven zones at corresponding times that the product is in the respective oven zones.

2. The system of claim 1, wherein the product is a first product, and wherein the baseline temperature profile represents product temperatures over time and is determined using direct measurements of a temperature of a second, test product while the second, test product is passed through each oven zone prior to the first product entering the oven.

3. The system of claim 1, wherein the instructions are further executable to
   receive, from an entry sensor of the oven via the communication interface, an entry time indicating that the product has entered the oven,
   receive, from a conveyor sensor of the oven via the communication interface, a conveyor speed measurement, and
   deriving a respective location of the product in the oven at a respective time each of the measured temperatures is captured using the conveyor speed measurement and a respective amount of time that has elapsed between the entry time and the respective time each of the measured temperatures is captured.

4. The system of claim 1, wherein each of the one or more zone temperature sensors is mounted in a respective associated zone of the oven.

5. The system of claim 1, wherein the instructions are further executable to compare one or more parameters of the predicted thermal profile to one or more thermal targets corresponding to a process specification for the product, and output an indication of product status based on the comparison.

6. The system of claim 5, wherein the one or more thermal targets include a threshold amount of time that the product was above a selected temperature, a threshold amount of time that the product was maintained between two targeted temperatures, and/or a maximum rate of change of temperature of the product.

7. The system of claim 5, further comprising outputting an instruction to one or more heating elements of the oven to adjust a temperature of one or more zones of the oven responsive to determining that one or more parameters of the predicted thermal profile are outside of a tolerance threshold from the one or more thermal targets.

8. The system of claim 1, wherein the communication interface is further connected to one or more additional sensors, and wherein the predicted thermal profile is calculated further using sensed data from the one or more additional sensors indicating additional parameters related to the oven.

9. The system of claim 8, wherein the additional parameters include zone convection rates, zone convection pressures, energy consumption, ambient room conditions, and/or exhaust rates for the oven.

10. A multi-zone oven comprising:
    a plurality of temperature sensors, each temperature sensor disposed in a different zone of the multi-zone oven;
    a conveyor configured to move a product through each zone of the multi-zone oven;
    a conveyor speed sensor;
    an oven entry sensor;
    a processor; and
    memory storing instructions executable by the processor to:
       detect, via the oven entry sensor, an entry of the product into a first zone of the multi-zone oven;
       capture, via the conveyor speed sensor, a speed measurement of the conveyor;
       determine entry into each zone of the multi-zone oven by determining a location of the product in the oven, the location being derived using the detected entry of the product and the speed measurement of the conveyor;
       capture, via each of the plurality of temperature sensors, at least one temperature measurement for each zone of the multi-zone oven while the product is within the respective zone; and
       output an indication of a temperature measurement for each zone while the product is within the respective zone.

11. The multi-zone oven of claim 10, wherein the instructions are further executable to compare one or more parameters of the predicted thermal profile to one or more associated thermal targets corresponding to a process specification for the product, and output an indication of product status based on the comparison.

12. The multi-zone oven of claim 10, further comprising a communication interface coupling the multi-zone oven to a remote database, and wherein the indication of the temperature measurement for each zone is output to the remote database via the communication interface, the remote database configured to maintain a historical record of operation of the multi-zone oven.

* * * * *